Patented June 30, 1953

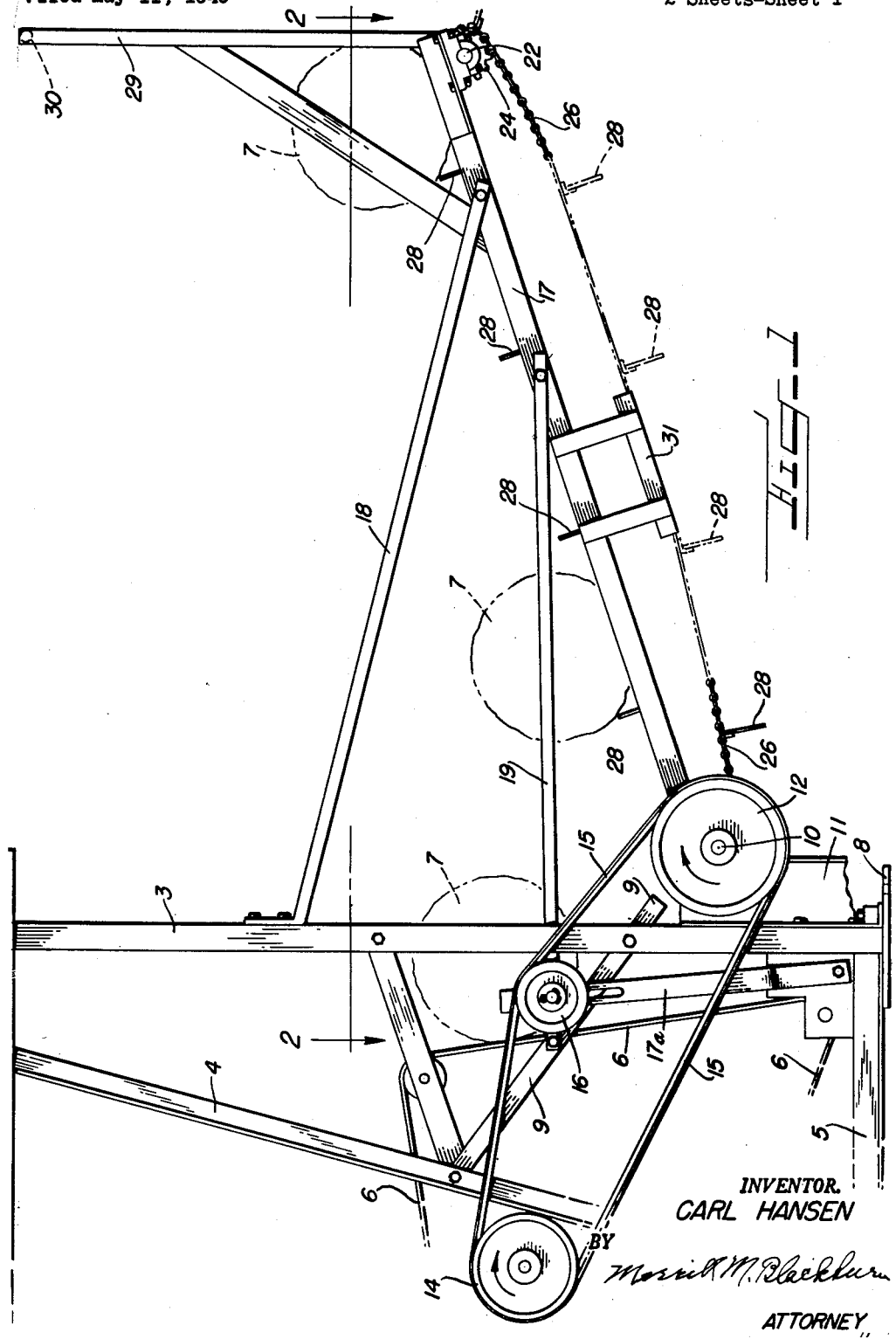

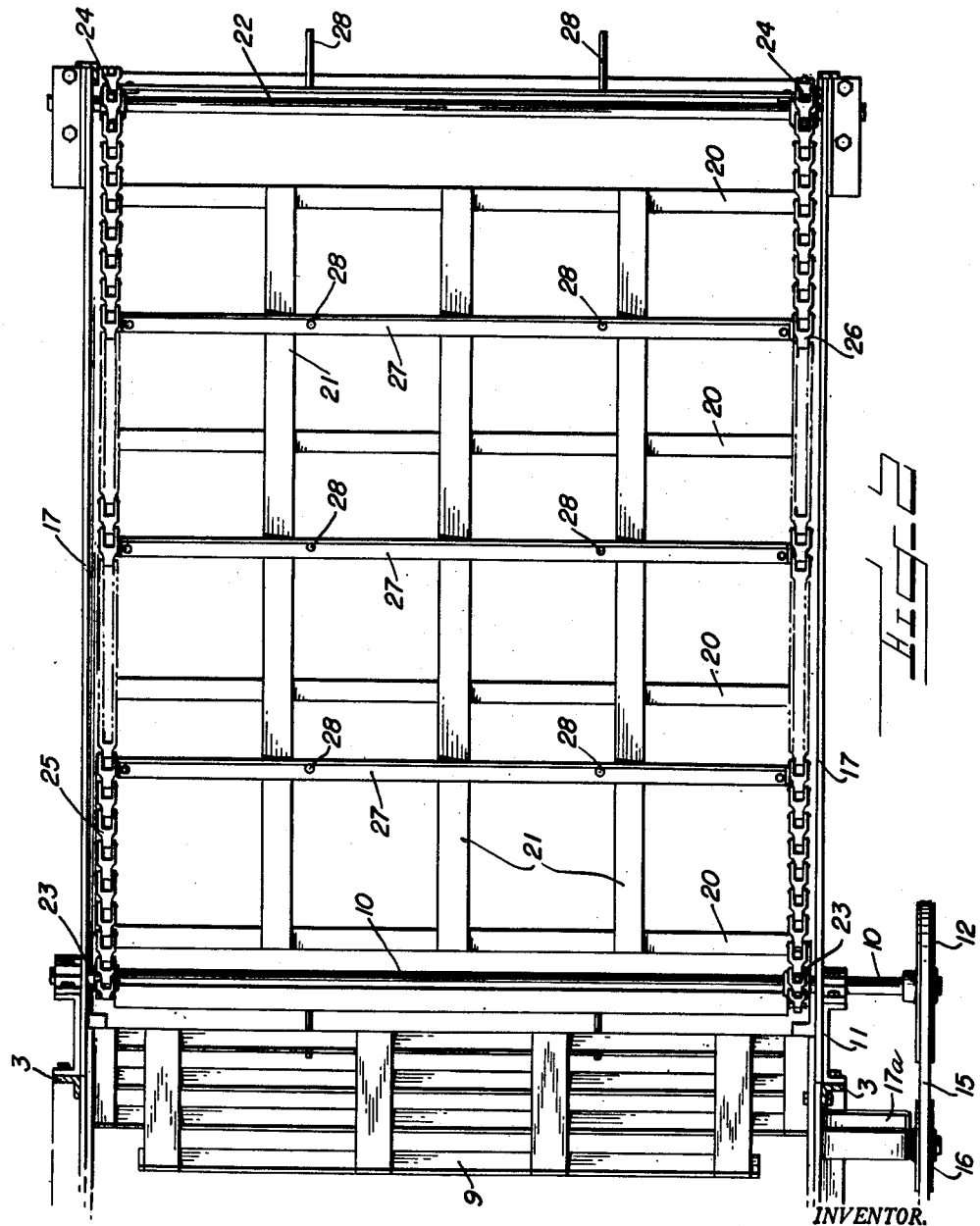

2,643,604

UNITED STATES PATENT OFFICE 2,643,604

BALE LOADER

Carl Hansen, Calamus, Iowa

Application May 11, 1949, Serial No. 92,569

2 Claims. (Cl. 100—88)

The present invention relates to bale loaders of the portable type. The balers with which the present invention is concerned are those which have a pick-up at the forward end and which form a cylindrical bale which is dropped at the rear of the baler with the bale axis horizontal and transverse to the direction of the travel of the baler. Such a baler is the "Roto-baler" manufactured by Allis-Chalmers. In the customary mode of using this type of baler, the bales are dropped on the ground as the machine moves along in the field. Accordingly, it is necessary to go over the field a second time to pick up the bales. This obviously necessitates the use of a second tractor and pick-up loader to load a wagon, also pulled by the second tractor. Factually, it is necessary either to use a third tractor to haul wagons to and from the barn or to allow picking up to lag behind the baling operation. This is distinctly disadvantageous.

In accordance with the present invention, a loader is mounted upon the baler. The loader is constructed to receive the bales directly from the baler, entirely dispensing with the customary pick-up operation. The baler is provided with a hitch for pulling a wagon in position to receive bales from the loader. When the improvements of the present invention are employed, the hay pickup, the baling, the loading, and the drawing of the wagon are performed as a unitary operation. A second tractor may be employed to shuttle wagons to and from the barn.

A preferred form of the present invention is shown in the accompanying drawings, in which:

Fig. 1 is an elevation of this loader, shown as mounted on a baler of the described type; and Fig. 2 represents a section substantially along the plane represented by the line 2—2, Fig. 1.

The frame members 3, 4, and 5 constitute the frame of a baler, the members 3 being vertical and at the rear of the baler. The member 5 is a lower frame member and is approximately parallel to the ground. Endless belt 6 is a portion of the bale former, the formed bale being delivered downwardly along the rearward reach of the belt, as shown. In normal operation, a bale, in the position of bale 7, will move downwardly on belt 6 and pass through the position where the wagon hitch 8 is located in the present construction.

In accordance herewith, a deflector 9 is provided which is located between the frame members 3 and in proximity to the belt 6. The deflector 9, from its edge adjacent the belt 6, is inclined rearwardly of the baler and downwardly, whereby bales deflected thereby will roll off of the deflector onto the elevator.

A shaft 10 is supported below the rearward edge of the deflector, being rotatably supported from the frame members 3 by supports 11. A pulley 12 is mounted on shaft 10. The pulley 12 is in driven engagement with a power pulley 14 of the baler, by a drive belt 15. An adjustable belt-tightener pulley 16, in engagement with the belt 15, is adjustably carried by the arm 17a.

The elevating portion of the loader is built upon a frame which includes side frame members 17. The forward ends of members 17 are secured to supports 11. Braces 18 and 19 are attached at their rearward ends to the members 17 and, at their forward ends, to frame members 3 and the deflector 9, respectively. By this means, the elevator frame members are maintained in a position rearwardly and extending upwardly from the baler. A plurality of frame bars 20 interconnect the two frame members 17. Rails 21 extend lengthwise of the frame and are positioned on and secured to the bars 20. A shaft 22 is rotatably carried by the outer ends of the frame members 17.

Two pairs of sprockets 23 and 24 are fixedly secured to the shafts 10 and 22, respectively. These sprockets are positioned immediately within the frame members 17 and in alignment with each other. Chains 25 and 26 are positioned about the sprockets 23 and 24. A plurality of conveyor bars 27 are secured to the chains 25 and 26, each bar being secured at each end thereof to one of said chains. The shaft 10 is positioned lower than the proximal ends of the rails 21, so that the upper portions of the sprockets 23 are at a level above the ends of the rails, whereby, as the upper reaches of the chains 25 and 26 are moved rearwardly, the angle iron conveyor bars 27 will clear the ends of the rails and ride thereon.

A pair of fingers 28 is mounted on each of the conveyor bars 27 to assist the conveyor bars in moving bales rearwardly on the loader along the rails.

A guard may desirably be secured to the rear end of the loader to prevent anyone who is riding in the wagon from falling on the loader. It also serves to hold the bale loader rigidly and prevent twisting thereof. Such a guard may be constituted of a pair of vertical arms 29 attached to the frame members 17 at the rear corners of the loader, and a guard rail 30 at the upper ends thereof, spaced upwardly of the shaft 22. A chain guide 31 may be secured to the frame members 17, midway of their lengths, in order to maintain the lower reach of the chains spaced from the frame members 17. By this means, as the loader is driven, and with a load being elevated, the lower reach will not shorten appreciably and concentrate the slack of the chain in the upper reach adjacent the sprockets 23.

With the baler in operation and being drawn along the field, a wagon is connected to the hitch 8 with the forward end thereof in proximity to the rear end of the loader. The pulley 14 is driven by the baler, which pulley, in turn, drives the pulley 12, through the belt 15. The pulley 12 drives the shaft 10, to which it is fixedly secured. Rotation of the shaft 10 clockwise rotates the sprockets 23 and moves the upper reaches of the chains 25 and 26 rearwardly, together with the associated conveyor bars 27.

A bale discharged by the baler downwardly on the belt 6 is deflected by the deflector 9 away from the belt 6 onto the loader. As best shown in Fig. 1, lower braces 19 are so connected with the deflector 9 and the loader frame members 17 that they are in a position to contact the ends of the bales as the latter are discharged from the forming belt 6 and pass across the deflector 9 onto the lower portion of the bale-conveying means of the loader, thus preventing each bale from falling off the inner end of the loader. Similarly, the outer ends of the brace members 18 and the adjacent braces for the guard 29, 30 are in a position and engage the ends of the bale, as shown in the right hand portion of Fig. 1, and thus prevent the bale from falling off the outer end of the loader. The bale will rest upon the rails 21 and will be moved rearwardly and upwardly therealong by the conveyor bars 27 and the pins 28 secured thereto, and will be discharged at the rearward end of the loader into the wagon.

It will of course be understood that the specific description of structure set forth above may be departed from by various modifications without departing from the spirit of this invention as disclosed in this specification and as defined in the appended claims.

Having now described my invention, I claim:

1. For use with a portable baler of the type having an approximately vertical frame, including a pair of laterally spaced-apart frame members, and means for delivering substantially cylindrical bales downwardly along a substantially vertically downwardly movable forming belt, positioned between said frame members, with the axes of the bales, in general, horizontal; the improvement which comprises a bale deflector, including side bars positioned on opposite sides of said forming belt and a transverse structure adapted to extend across in front of said belt, means for securing the side bars of said bale deflector to said frame members in a position therebetween and closely adjacent the discharge portion of said belt with said transverse structure extending downwardly and outwardly from said rear of the forming belt, in order to intercept a bale discharged therefrom, a conveyor frame adapted to be positioned with one end thereof adjacent the lower portions of said frame members and below deflector and in proximity to said belt, said frame extending away and upwardly from said belt and deflector, and means for conveying bales on said frame upwardly along said frame remote from said belt.

2. For use with a portable baler of the type having an approximately vertical frame, including a pair of laterally spaced-apart frame members, and means for delivering substantially cylindrical bales downwardly and rearwardly from a forming belt, positioned between said frame members, with the axes of the bales, in general, horizontal; the improvement which comprises a bale deflector, including side bars positioned on opposite sides of said forming belt and a transverse bale-receiving structure affixed to said side bars and positioned with its inner portion inwardly of said frame members and extending across in front of said forming belt, the outer portion of sid deflector extending outwardly of said frame members, means for securing the side bars of said bale deflector to said frame members in a position therebetween and closely adjacent the discharge portion of said belt with said transverse structure extending downwardly and outwardly from the forming belt, in order to intercept a bale discharged therefrom, a conveyor frame adapted to be positioned with one end thereof adjacent the lower portions of said frame members and below deflector and in proximity to said belt, said frame extending away and upwardly from said belt and deflector, and means for conveying bales on said frame upwardly along said frame remote from said belt.

CARL HANSEN.

References Cited in the file of this patent

UNITED STATES PATENTS

| Number | Name | Date |
|---|---|---|
| 799,175 | Luebben | Sept. 12, 1905 |
| 862,105 | Reagan | July 30, 1907 |
| 930,719 | Battee | Aug. 10, 1909 |
| 1,312,304 | Burgess | Aug. 5, 1919 |
| 1,857,373 | Goggins | May 10, 1932 |
| 2,305,495 | Rehn | Dec. 15, 1942 |
| 2,347,522 | Stinnett | Apr. 25, 1944 |
| 2,390,306 | Hunziker | Dec. 4, 1945 |
| 2,431,892 | Russell | Dec. 2, 1947 |
| 2,613,591 | Bruns et al. | Oct. 14, 1952 |